United States Patent
Husak et al.

(10) Patent No.: US 10,264,235 B2
(45) Date of Patent: *Apr. 16, 2019

(54) COMPATIBLE STEREOSCOPIC VIDEO DELIVERY

(71) Applicant: Dolby Laboratories Licensing Corporation, San Francisco, CA (US)

(72) Inventors: Walter J. Husak, Simi Valley, CA (US); David Ruhoff, Marina del Rey, CA (US); Alexandros Tourapis, Los Gatos, CA (US); Athanasios Leontaris, Mountain View, CA (US)

(73) Assignee: Dolby Laboratories Licensing Corporation, San Francisco, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/044,836

(22) Filed: Jul. 25, 2018

(65) Prior Publication Data

US 2018/0332269 A1    Nov. 15, 2018

Related U.S. Application Data

(63) Continuation of application No. 15/969,349, filed on May 2, 2018, now Pat. No. 10,038,891, which is a
(Continued)

(51) Int. Cl.
*H04N 13/00* (2018.01)
*H04N 13/161* (2018.01)
(Continued)

(52) U.S. Cl.
CPC ......... *H04N 13/161* (2018.05); *H04N 13/139* (2018.05); *H04N 13/15* (2018.05);
(Continued)

(58) Field of Classification Search
CPC .......... H04N 13/0048; H04N 19/00769; G01S 13/931
(Continued)

(56) References Cited

U.S. PATENT DOCUMENTS 4,027,333 A   5/1977   Kaiser
4,523,223 A   6/1985   Lueder
(Continued)

FOREIGN PATENT DOCUMENTS

DE   19619598   11/1997
EP   0306448    3/1989
(Continued)

OTHER PUBLICATIONS

Bjontegaard, et al., "Adaptive Deblocking Filter", IEEE Transactions on Circuits and Systems for Video Technology, vol. 13, No. 7, Jul. 2003, pp. 614-619.
(Continued)

*Primary Examiner* — Nguyen T Truong

(57) ABSTRACT

Stereoscopic images are subsampled and placed in a "checkerboard" pattern in an image. The image is encoded in a monoscopic video format. The monoscopic video is transmitted to a device where the "checkerboard" is decoded. Portions of the checkerboard (e.g., "black" portions) are used to reconstruct one of the stereoscopic images and the other portion of the checkerboard (e.g., "white" portions) are used to reconstruct the other image. The subsamples are, for example, taken from the image in a location coincident to the checkerboard position in which the subsamples are encoded.

5 Claims, 5 Drawing Sheets

Related U.S. Application Data continuation of application No. 15/876,975, filed on Jan. 22, 2018, now Pat. No. 9,992,476, which is a continuation of application No. 15/808,675, filed on Nov. 9, 2017, now Pat. No. 9,912,931, which is a continuation of application No. 15/625,854, filed on Jun. 16, 2017, now Pat. No. 9,843,785, which is a continuation of application No. 14/941,992, filed on Nov. 16, 2015, now Pat. No. 9,712,801, which is a continuation of application No. 13/054,855, filed as application No. PCT/US2009/050809 on Jul. 16, 2009, now Pat. No. 10,136,118.

(60) Provisional application No. 61/082,217, filed on Jul. 20, 2008.

(51) Int. Cl.

| | |
|---|---|
| *H04N 13/139* | (2018.01) |
| *H04N 13/15* | (2018.01) |
| *H04N 13/194* | (2018.01) |
| *H04N 19/597* | (2014.01) |
| *H04N 19/61* | (2014.01) |
| *H04N 19/60* | (2014.01) |
| *H04N 19/59* | (2014.01) |
| *H04N 19/00* | (2014.01) |

(52) U.S. Cl.
CPC ........... *H04N 13/194* (2018.05); *H04N 19/00* (2013.01); *H04N 19/59* (2014.11); *H04N 19/597* (2014.11); *H04N 19/60* (2014.11); *H04N 19/61* (2014.11)

(58) Field of Classification Search
USPC .......................................................... 348/43
See application file for complete search history.

(56) References Cited

U.S. PATENT DOCUMENTS

| | | |
|---|---|---|
| 4,985,767 A | 1/1991 | Haghiri |
| 5,416,510 A | 5/1995 | Lipton |
| 6,055,012 A | 4/2000 | Haskell |
| 6,661,463 B1 | 12/2003 | Geshwind |
| 2003/0076423 A1 | 4/2003 | Dolgoff |
| 2003/0223499 A1 | 12/2003 | Routhier |
| 2005/0117637 A1 | 6/2005 | Routhier |
| 2007/0222855 A1 | 9/2007 | Krijn |
| 2008/0036854 A1 | 2/2008 | Elliott |
| 2008/0170753 A1 | 7/2008 | Park |
| 2008/0285863 A1 | 11/2008 | Moon |
| 2009/0002481 A1 | 1/2009 | Kim |
| 2009/0174704 A1 | 7/2009 | Sellers |
| 2010/0111193 A1 | 5/2010 | Pandit |
| 2011/0164112 A1 | 7/2011 | Husak |

FOREIGN PATENT DOCUMENTS

| | | |
|---|---|---|
| WO | 03056843 | 7/2003 |
| WO | 2005120085 | 12/2005 |
| WO | 2008023917 | 2/2008 |
| WO | 2008/150111 | 12/2008 |

OTHER PUBLICATIONS

Hutchison, D. C. et al "The Design and Implementation of a Stereoscopic Microdisplay Television" IEEE Transactions on Consumer Electronics, vol. 54, No. 2, May 2008, pp. 254-261.

Hutchison, David C. "Introducing DLP 3-D TV" Texas Instruments, publication date: Unknown.

McCormick, M. et al "Implementation of Stereoscopic and Dual View Images on a Micro-Display High Definition Television" IEEE 3DTV-CON, May 28-30, 2008, Istanbul, Turkey, pp. 33-36.

Tseng, et al., "Compatible Video Coding of Stereoscopic Sequences Using MPEG-2's Scalability and Interlaced Structure" 1994.

FIG. 3

COMPATIBLE STEREOSCOPIC VIDEO DELIVERY

CROSS REFERENCE TO RELATED APPLICATIONS

This application is a continuation of U.S. patent application Ser. No. 15/969,349, filed on May 2, 2018, which is a continuation of U.S. patent application Ser. No. 15/876,975, filed on Jan. 22, 2018, (now U.S. Pat. No. 9,992,476), which is a continuation of U.S. patent application Ser. No. 15/808,675, filed on Nov. 9, 2017, (now U.S. Pat. No. 9,912,931), which is a continuation of U.S. patent application Ser. No. 15/625,854, filed on Jun. 16, 2017, (now U.S. Pat. No. 9,843,785), which is continuation of U.S. patent application Ser. No. 14/941,992, filed on Nov. 16, 2015, (now U.S. Pat. No. 9,712,801), which is a continuation of U.S. patent application Ser. No. 13/054,855, filed on Jan. 19, 2011, which is the national stage entry for PCT Application Ser. No. PCT/US2009/050809, filed on Jul. 16, 2009, which claims the benefit of priority to U.S. Provisional Patent Application No. 61/082,217, filed on Jul. 20, 2008, all of which are hereby incorporated by reference in their entirety.

TECHNOLOGY

The present invention relates to video coding and more particularly to stereoscopic video coding.

BACKGROUND

Description of Related Art

In recent years, content providers have become considerably interested in the delivery of stereoscopic (3D) content into the home. This interest is driven by the increased popularity and production of 3D material, but also the emergence of several stereoscopic devices that are already available to the consumer. Although several systems have been proposed on the delivery of stereoscopic material to the home that combine specific video view "arrangement" formats with, primarily, existing video compression technologies such as ISO MPEG-2, MPEG-4 AVC/ITU-T H.264, and VC-1, these systems do not provide any information on how the video encoding process should be performed. This has consequently resulted in poorly designed stereo video encoding solutions with subpar performance, which has been detrimental in the adoption of such systems.

SUMMARY OF THE INVENTION

The present inventors have realized the need to provide an existing format compliant 3D delivery system. Roughly described, the present invention provides a 3D delivery system that is backward compatible with existing monoscopic delivery systems. This allows, for example, a Blu-ray video disc to be encoded under the Blu-ray format with Stereoscopic data with the capability to be played on an ordinary Blue Ray player and feed a 3D compatible display device for viewing by the consumer. The present invention may be practiced by all other monoscopic formats including, for example, DVD formats, HD-DVD, the MPEG family, JPEG, etc.

In one embodiment, the present invention provides a method comprising the step of embedding a stereoscopic signal in a monoscopic-compatible video infrastructure. In one embodiment, the embedded stereoscopic signal comprises a video format where pixels from a first and a second image are stored in a "checkerboard" pattern within the monoscopic compatible video infrastructure.

In one embodiment, the method further comprises the step of reducing pixels of a pair of stereoscopic images to be embedded in the video infrastructure. The step of reducing pixels comprises, for example, subsampling the pair of stereoscopic images and placing the subsamples in a frame of the video infrastructure. The step of reducing pixels comprises filtering the pair of stereoscopic images and mixing the filtered images into a single frame of the video infrastructure. The subsampling may be performed, for example on coincident samples of the images, related samples of the images, and/or the subsampling of a first of the stereoscopic images is offset from the subsampling of a second of the stereoscopic images. In one embodiment, the locations of subsampling of a first of the stereoscopic images is alternated with locations of subsampling of a second of the stereoscopic images.

The method further comprises, for example, the step of arranging the subsamples in a lattice structure in a frame of the video infrastructure. Each subsample is placed, for example, in a corresponding location in the lattice structure occupied by the subsample in the image from which it was subsampled. The monoscopic compatible infrastructure comprises, for example, any of a Blu-ray compatible video format, and HD-DVD compatible video format, an Internet transmission format, a Direct-TV compatible video format, any of the MPEG family of formats, and an ATSC compatible video format.

In another embodiment, the present invention comprises a method, comprising the steps of, reducing pixels of a pair of stereoscopic images, formatting the reduced pixels into an image pattern, and encoding the image pattern as a frame in a monoscopic video format. The step of reducing pixels comprises, for example, subsampling the stereoscopic images. The subsampling comprises, for example, sampling half of the pixels in a first of the stereoscopic images and subsampling half of the pixels in a second of the stereoscopic images.

In various embodiments, the image pattern comprises a lattice pattern of pixels comprising a checkerboard wherein "black" pixels of the checkerboard comprise pixels derived from a first image of the stereoscopic pair of images and "white" pixels of the checkerboard comprise pixels derived from a second image of the stereoscopic pair of images. A location of the pixels in the lattice pattern comprises, for example, a coincident location in the image from which they were derived.

The method further comprises, for example, the step of decoding the "black" pixels into a first channel of a stereoscopic image and decoding the "white" pixels into a second channel of the stereoscopic image.

The present invention may also be embodied in an encoding device, comprising, an input port configured to receive a bit pattern comprising stereoscopic image pairs to be encoded, and an encoder configured to place at least portions of each stereoscopic image pair into a monoscopic-compatible video encoded bit stream. The encoder is configured, for example, to produce a lattice structure comprising portions of each image of a stereoscopic image pair. The lattice structure is produced, for example, by reduction and reordering of pixels comprising alternately subsampling each of the images and placing the subsamples in locations of a lattice structure corresponding to the locations of the image from which they were subsampled. The monoscopic-compatible video encoded bit stream comprises at least one of an ATSC format, a Blu-ray format, an HD-DVD format, an existing video format, one of the MPEG family of formats, and another video format.

The invention may also be embodied as a decoding device, comprising, an input port configured to receive a monoscopic formatted image signal, a processor configured to decode the monoscopic formatted image signal, and an image separator configured to extract a first image from each frame of the decoded monoscopic formatted image signal and extract a second image from each frame of the decoded monoscopic formatted image. The decoding device further comprises, for example, an image extractor configured to extract and expand each image to a full frame of a target device. The target device comprises, for example, at least one of a display, an HDTV display, a cinema display, a cell phone display, a computer display. The decoding device may further be part of a larger media system comprising a display and the image expander is configured to extract pixels for expansion in for each image from a checkerboard pattern within the decoded monoscopic formatted image.

The invention may also be embodied in any device or method that receives a monoscopic formatted video and extracts and displays the multiple images in any format. In one embodiment, the multiple images are extracted from a checkerboard pattern within the monoscopic formatted image and then display as a 3D video.

Portions of both the devices and methods, and/or other embodiments, may be conveniently implemented in programming on a general purpose computer, or networked computers, and the results may be displayed on an output device connected to any of the general purpose, networked computers, or transmitted to a remote device for output or display. In addition, any components of the present invention represented in a computer program, data sequences, and/or control signals may be embodied as an electronic signal broadcast (or transmitted) at any frequency in any medium including, but not limited to, wireless broadcasts, and transmissions over copper wire(s), fiber optic cable(s), and co-ax cable(s), etc.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein:

FIG. 3 is an illustration of an image lattice structure according to an embodiment of the present invention.

DESCRIPTION OF THE PREFERRED EMBODIMENTS

Many current consumer stereoscopic systems require additional processes—either as hardware devices or software applications—that the consumer must purchase and install. This presents a significant barrier to market for the consumer and to the studios.

The present inventors have realized an implementation that allows the transmission of a stereoscopic signal in a manner reusing the existing television and video infrastructure by embedding the stereoscopic signal in a monoscopic-compatible signal. Using such an implementation, content distributors would then be able to deploy stereoscopic theatrical content into the home in order to exploit the marketing effort as close to the theatrical release date as possible.

The present invention creates a method of distribution that can fit in the current HD-DVD or Blu-ray, broadcast, and other distribution infrastructures and also allows flexibility for future systems. Specifically, a future system could allow full bandwidth stereoscopic signals to be transmitted while still maintaining backward compatibility with legacy stereoscopic devices. In this invention, a method of encoding stereoscopic signals is combined with a number of image coding and picture structuring techniques in a novel way.

Figure 1A:
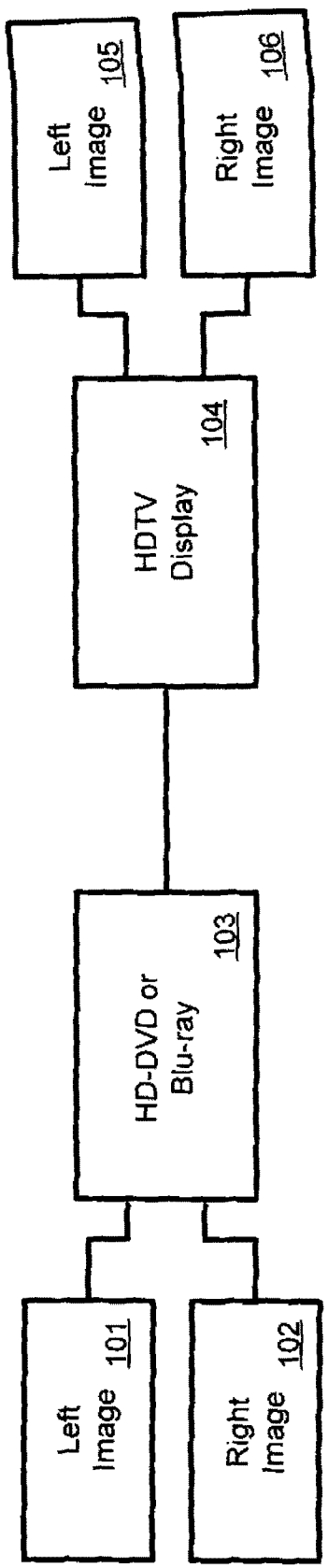
FIG. 1A is a block diagram illustrating a basic structure according to an embodiment of the present invention.

Referring now to the drawings, wherein like reference numerals designate identical or corresponding parts, and more particularly to FIG. 1A thereof, there is illustrated a basic structure according to an embodiment of the present invention. The left and right images 101/102 comprise 2 still images or two image streams representing the left and right images of a stereoscopic production. As illustrated at 103, the images are encoded and packaged in a compliant means onto, for example, a standard HD-DVD or Blu-ray disc. The resulting stereoscopic data appears as a standard image and can be presented to a display in its encoded form. The display decodes the stereoscopic data back into its left and right image forms, where they are displayed (e.g., HDTV 104) where they appear as left and right images 105/106.

Figure 1B:
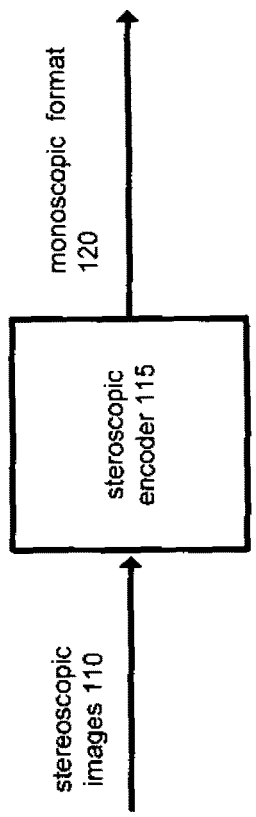
FIG. 1B is a diagram of an encoder according to an embodiment of the present invention.

FIG. 1B is a diagram of an encoder according to an embodiment of the present invention. Stereoscopic images 110 are fed to an encoder 115. The images are packaged as a monoscopic format 120. The monoscopic format comprises an existing monoscopic format, for example, a Blu-ray format, an ATSC broadcast, or other formats.

Figure 1C:
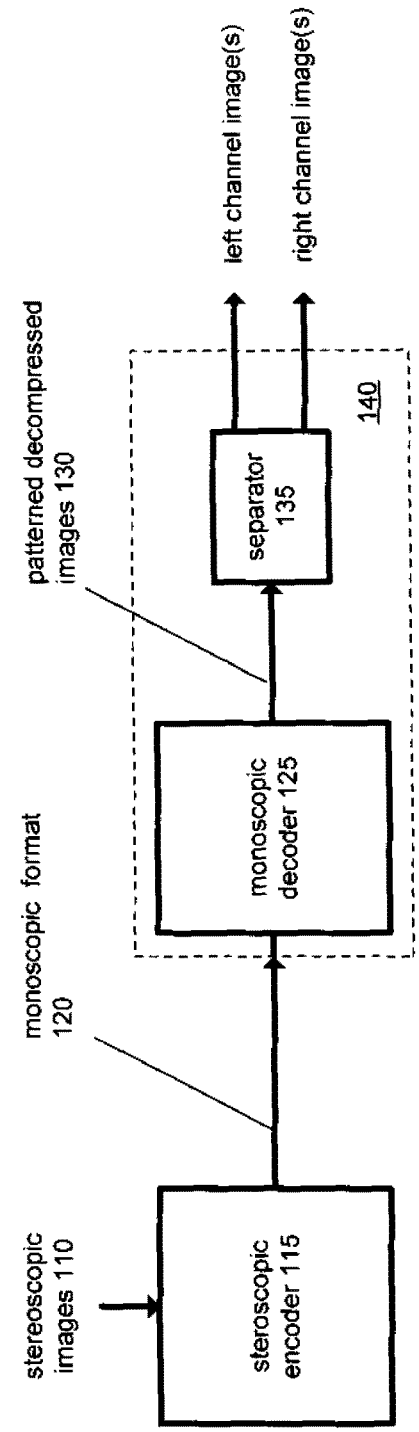
FIG. 1C is a diagram of a system for encoding and decoding images according to an embodiment of the present invention.

FIG. 1C is a diagram of a system for encoding and decoding images according to an embodiment of the present invention. Stereoscopic images 110 are fed to an encoder 115. The images are packaged as a monoscopic format 120. The stereoscopic images are, for example, a series of left and right channel images of a 3D video. The monoscopic format comprises a monoscopic video signal where in each frame of the video is packaged with the left and right channel images from each frame of the 3D video (monoscopic packaged 3D video signal).

A monoscopic decoder 125 includes at least one port for receiving a monoscopic video, and is fed the monoscopic packaged 3D video signal. The at least one port comprises, for example, any of an HDMI port, antenna port, S-Video connector, a cable connector, video/audio component or composite connectors, network connector, 802.11 wireless, etc. In some embodiments related to transmission or carrier (e.g., 802.11), the monoscopic video signal is further packaged within the related transmission or carrier transport protocol and an additional device for extracting the monoscopic signal from the transport protocol and/or other protocols (not shown) is utilized. Ultimately, the monoscopic packaged 3D signal is received by the monoscopic decoder 125.

The monoscopic decoder 125 decodes the monoscopic packaged 3D signal according to the standard of the monoscopic format (e.g., Blu-ray, ATSC, etc). The decoded signal is a monoscopic video in which the images of the video are pattern decompressed images 130. That is, each image or frame of the decoded signal is a pattern image where the pattern comprises left and right channel images of the original stereoscopic images 110.

A separator 135 follows a set or variable pattern in which the images are embedded in the decoded signal (pattern decompressed images 130) and extracts the original (original compressed and then decompressed) images (e.g., left and right channel images). The separator 135 may be a separate device or may be packaged as part of a decoding system 140.

Figure 1D:
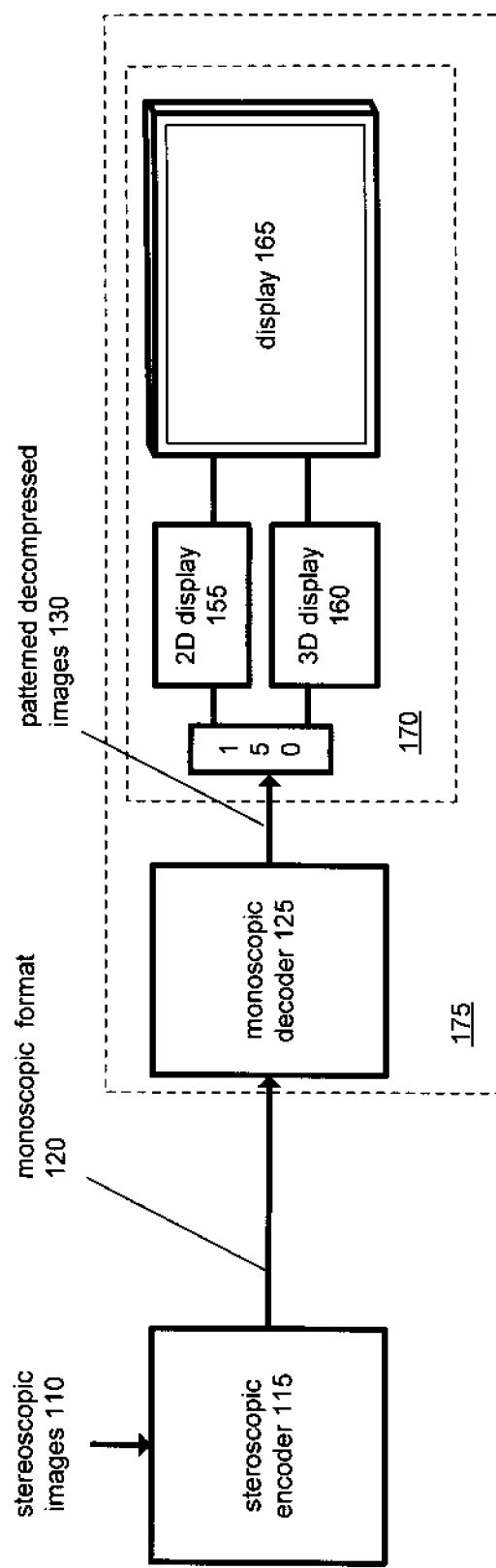
FIG. 1D is a diagram of system for encoding, decoding and displaying images according to an embodiment of the present invention.

FIG. 1D is a diagram of system for encoding, decoding and displaying images according to an embodiment of the present invention. The monoscopic decoder 125 decodes the monoscopic packaged 3D signal according to the standard of the monoscopic format (e.g., Blu-ray, ATSC, etc). The decoded signal is a monoscopic video in which the images of the video are pattern decompressed images 130. That is, each image or frame of the decoded signal is a pattern image where the pattern comprises left and right channel images of the original stereoscopic images 110.

A pattern recognizer 150 identifies an input signal as being either a standard monoscopic video encoded signal or a multi-image (e.g., stereo) encoded signal. The recognition may be performed, for example, by comparing adjacent or otherwise related pixels in the decompressed pattern or constructing entire images based on a 3D encoded monoscopic pattern and comparing the resulting images.

Based on the recognition, the signal is then processed accordingly (e.g., the signal is routed to 2D display processing 155 for standard monoscopic video or the signal is routed to 3D display processing 160 for monoscopic packaged 3D), the results of which are then provided to and displayed on display 165. In one embodiment, the pattern recognizer and associated processing/processing devices are packaged together in a display (e.g., HDTV), as, for example, system 170. In another embodiment, the monoscopic decoder is also packaged together with the display (system 175).

Figure 2:
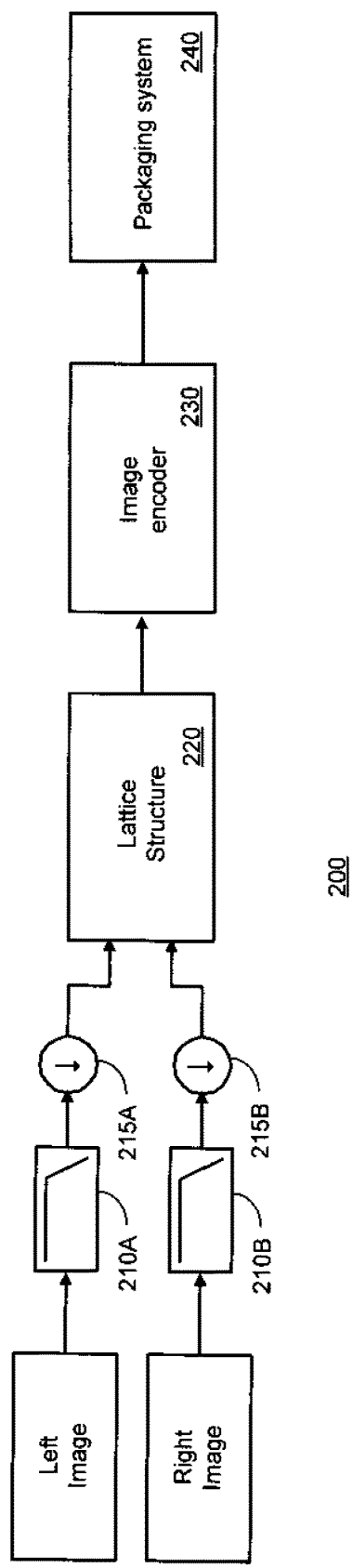
FIG. 2 is a diagram illustrating a system topology according to an embodiment of the present invention.

FIG. 2 is a diagram illustrating a system topology 200 according to an embodiment of the present invention. In FIG. 2, two images are presented to the apparatus, one taken from the left perspective and the other from the right perspective both together forming a stereoscopic pair. These two images are, for example, low pass filtered 210A/210B and sub-sampled 215A/215B by, for example, a factor of two. The sub-sampling operation produces left and right samples (e.g., pixels) from the left and right images. The sub-sampling operation may be done in and may occur on coincident locations on both left and right images or the sampled locations can be offset from one image to the other. The preferred embodiment is to use offset sampling as shown in the lattice (or checkerboard) structure described below.

Figure 3:
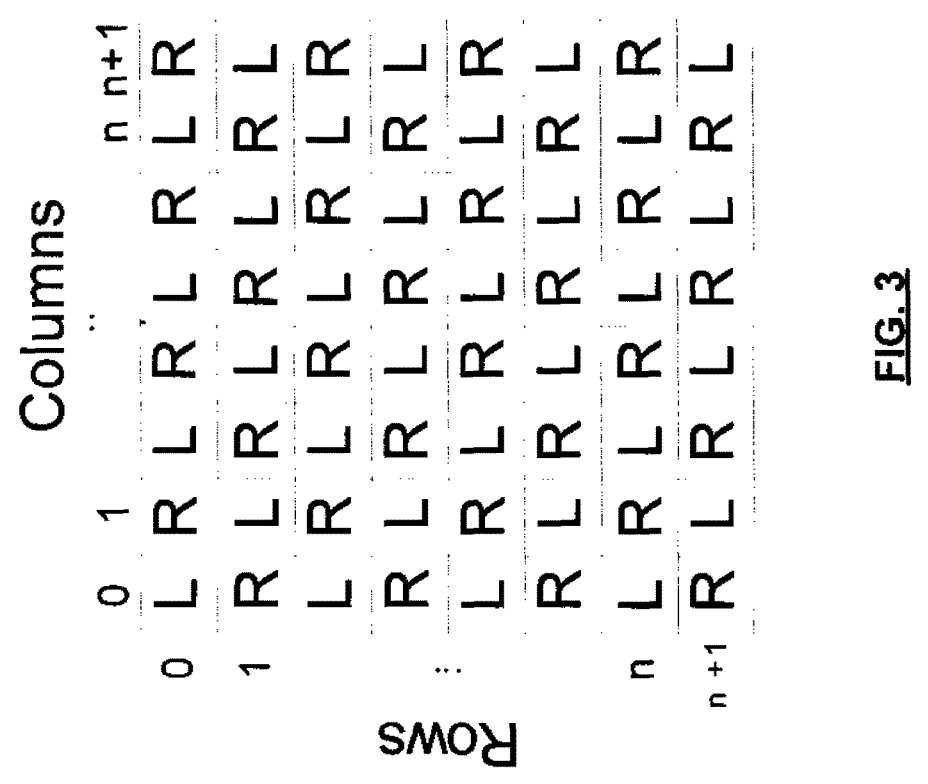

The sampled image data is then arranged into a 3D image lattice structure by lattice structure device/processor 220. The 3D image lattice structure is shown in FIG. 3. The left and right samples are arranged in alternating order within each line and then in the opposite order in the next line. This pattern is repeated throughout the lattice. The lattice structure aids in providing increased resolution in both the horizontal and vertical dimensions upon image decoding with the described system. Rather than reducing resolution in one dimension, the resolution is reduced in both dimensions but by a lesser amount. The result is a resolution reduction of approximately 0.7 fs rather than 0.5 fs.

In one embodiment, the lattice structure changes, or alternates at a predetermined rate (e.g., once per frame). As shown in FIG. 3, the rows of the lattice structure alternate between a L/R and a R/L patterns (a frame pattern of L/R-R/L). The entire structure may also be alternated between different frame patterns. For example, a first frame comprises the L/R-R/L pattern and the second frame comprises a R/L-L/R pattern.

Once the lattice is populated with pixels in the prescribed manner, the images are presented to an image encoder. The left and right image sequences are temporally related and can make use of encoders such as MPEG encoders, JPEG encoders, or any other encoders used in video compression. In one embodiment, colorspace conversion and chrominance sub-sampling are utilized during the encoding step (e.g., encoder 115).

Data produced by the image encoder 230 (e.g., a 3D encoded monoscopic pattern) is then packaged using a common transport mechanism by packaging system 240. The transport mechanism is, for example, an MPEG-2 transport stream or program stream. The net result of the packaging step is to create a method where backward compatibility is preserved with deployed systems. While the preferred embodiment is designed for HD-DVD or Blu-ray discs, the properly packaged data can be delivered using any digital streaming method such as the internet or conventional digital television broadcasting. Broadcasting can take the form of terrestrial broadcasting, closed cable delivery systems, or satellite delivery systems.

The decode side of the system comprises a reverse of the encode side. The delivered bit stream is presented to the decode apparatus by the distribution system. The encoded image data is extracted using a demultiplexer and delivered to an image decoder. The image decoder converts the compressed bitstream into the stereoscopic image data still in the lattice structure. The lattice structure is then transmitted to the display for final decoding into the left and right image pairs.

The decoding of the image is realized by removing the image data from the lattice structure and up sampling to the original image sizes (e.g., 3D processing 160 includes, for example, separates portions of the lattice structure related to each image and up-converts those samples to create the full images). The left and right image pairs are then presented to the viewer by, for example, displaying each image in separate "flashes" on a display screen, interlacing the individual images into a frame to be displayed, or other techniques.

The use of the lattice structure provides the stereoscopic functionality to existing HD-DVD and Blu-ray players while not obsolescing the installed players. The system can employ messaging to configure the players to automatically provide the stereoscopic data to the display. These messages can be embedded in the bitstream in any number of ways including special SEI messages, MPEG private data, or as Java code in the stream.

Although the present invention has been described herein with reference to stereographic displays, the discussion herein also applies to the coding, transmission, and decoding of multiple images in general. In fact, the present invention specifically includes embodiments with multiple images. In one embodiment, a Blu-ray disk (or other medium) according to the present invention may include, for example, both 2D and 3D versions of a movie or other production. In another embodiment, two separate 2D versions are included on the medium (e.g., left and right views) making the system compatible with systems with multiple decoders and do not wish to use the selected lattice or checkerboard pattern (for whatever reason).

The bitrate between separate versions may allocated, for example, according to the complexity of each version. Complexity could be estimated given a variety of methods including MCTF preanalysis, basic encoding (i.e. intra) using the same quantization parameters and bitrate ratio computation, or could just be based on user input or other factors. In a different embodiment, this could be done in a way to achieve a certain "average" distortion in either stream (this can be the same or could be adjusted given a model or user input).

In describing preferred embodiments of the present invention illustrated in the drawings, specific terminology is employed for the sake of clarity. However, the present invention is not intended to be limited to the specific terminology so selected, and it is to be understood that each specific element includes all technical equivalents which operate in a similar manner. For example, when describing a Blu-ray player, any other equivalent device, such as DVD players, HD-DVD players, devices that deliver content (including memory devices, memory sticks, cameras, I-pods, etc), or other device having an equivalent function or capability, whether or not listed herein, may be substituted therewith.

Furthermore, the inventors recognize that newly developed technologies not now known may also be substituted for the described parts and still not depart from the scope of the present invention. In fact the present invention specifically envisions application to new video standards and the like not yet known or published. All other described items and other equivalents, including, but not limited to sampling, filters, transmission protocols, storage protocols/formats, encoders, and displays (e.g., LCD, LCoS, Plasma, cinema projection, cinema projection processors/servers, cinema storage devices, DLP devices, etc) should also be considered in light of any and all available equivalents.

Portions of the present invention may be conveniently implemented using a conventional general purpose or a specialized digital computer or microprocessor programmed according to the teachings of the present disclosure, as will be apparent to those skilled in the computer art.

Appropriate software coding can readily be prepared by skilled programmers based on the teachings of the present disclosure, as will be apparent to those skilled in the software art. The invention may also be implemented by the preparation of application specific integrated circuits or by interconnecting an appropriate network of conventional component circuits, as will be readily apparent to those skilled in the art based on the present disclosure.

The present invention includes a computer program product which is a storage medium (media) having instructions stored thereon/in which can be used to control, or cause, a computer to perform any of the processes of the present invention. The storage medium can include, but is not limited to, any type of disk including floppy disks, mini disks (MD's), optical discs, DVD, HD-DVD, Blu-ray, CD-ROMS, CD or DVD RW+/−, micro-drive, and magneto-optical disks, ROMs, RAMs, EPROMs, EEPROMs, DRAMs, VRAMs, flash memory devices (including flash cards, memory sticks), magnetic or optical cards, SIM cards, MEMS, nanosystems (including molecular memory ICs), RAID devices, remote data storage/archive/warehousing, or any type of media or device suitable for storing instructions and/or data.

Stored on any one of the computer readable medium (media), the present invention includes software for controlling both the hardware of the general purpose/specialized computer or microprocessor, and for enabling the computer or microprocessor to interact with a human user or other mechanism utilizing the results of the present invention. Such software may include, but is not limited to, device drivers, operating systems, and user applications. Ultimately, such computer readable media further includes software for performing the present invention, as described above.

Included in the programming (software) of the general/specialized computer or microprocessor are software modules for implementing the teachings of the present invention, including, but not limited to, sampling images, filtering image data, encoding multi-image data into predetermined patterns, encoding multi-image data into a lattice (or checkerboard structure), encoding a multi-image structure into a monoscopic image format, decoding monoscopic encoded data and expanding the decoded data into multiple (e.g., stereo 3D) images and the display, storage, or communication of results according to the processes of the present invention.

The present invention may suitably comprise, consist of, or consist essentially of, any of element (the various parts or features of the invention) and their equivalents as described herein. Further, the present invention illustratively disclosed herein may be practiced in the absence of any element, whether or not specifically disclosed herein.

Obviously, numerous modifications and variations of the present invention are possible in light of the above teachings. It is therefore to be understood that within the scope of claims to be included in a subsequently filed utility patent application, the invention may be practiced otherwise than as specifically described herein.

What is claimed is:

1. A method for decoding a packed image in a sequence of coded images, the method comprising:
by apparatus comprising one or more data processors configured by software, one or more programmable logic devices, one or more logic circuits or a combination thereof:
receiving encoded image data comprising a sequence of coded frames, wherein a coded frame in the sequence of frames comprises samples of a first image and samples of a second image packed together in a monoscopic video format, wherein the monoscopic video format is determined using SEI messaging in the encoded image data;
decoding the coded frame to generate a decoded frame;
unpacking the decoded frame based on the monoscopic video format to generate decoded samples of the first image and decoded samples of the second image, wherein the decoded samples of the first image and the second image are arranged in accordance with the monoscopic video format in a lattice checkerboard pattern wherein "black" pixels in the lattice pattern comprise sampled pixels of the first image and "white" pixels in the lattice pattern comprise sampled pixels of the second image, wherein
sampling the "black" pixels of the first image comprises: on even rows, sampling only the even columns of the first image, and on odd rows sampling only the odd columns of the first image, and
sampling the "white" pixels of the second image comprises: on even rows, sampling only the odd columns of the second image, and on odd rows sampling only the even columns of the second image;

upsampling the decoded samples of the first image to generate a first output image; and upsampling the decoded samples of the second image to generate a second output image.

2. The method of claim 1, further comprising storing the decoded frame, the first output image and the second output image.

3. The method of claim 1, further comprising outputting the first output image and the second output image.

4. The method of claim 1, wherein the first image and second image represent two views of a stereoscopic image.

5. The method of claim 1, wherein the coded frame is encoded according to at least one of a Blu-Ray compatible video format, a DVD compatible format, an MPEG format, and an ATSC compatible video format.

* * * * *